United States Patent [19]
Burris

[11] 3,823,728
[45] July 16, 1974

[54] CONTROL SYSTEM FOR LIQUID TREATMENT

[76] Inventor: W. Alan Burris, 7 E. Jefferson Cir., Pittsford, N.Y. 14534

[22] Filed: Dec. 29, 1972

[21] Appl. No.: 319,783

[52] U.S. Cl.......... 137/88, 137/101.19, 137/101.25, 210/63, 210/97, 210/110
[51] Int. Cl............................................. C02b 1/38
[58] Field of Search .............. 137/98, 101.19, 88, 7; 210/97, 63, 103, 109, 110; 204/313

[56] References Cited
UNITED STATES PATENTS

| | | | |
|---|---|---|---|
| 2,043,701 | 6/1936 | Hartman............................ | 210/63 X |
| 2,826,211 | 3/1958 | Reed.................................... | 137/98 |
| 2,872,415 | 2/1959 | Schleyer et al. ...................... | 210/63 |
| 3,151,064 | 9/1964 | Lathrop................................ | 210/63 |
| 3,634,229 | 1/1972 | Stanley, Jr. ........................ | 210/97 X |

Primary Examiner—Robert G. Nilson
Attorney, Agent, or Firm—Cumpston, Shaw & Stephens

[57] ABSTRACT

A system for adding material to a liquid on variable demand is controlled by a switch responsive to liquid pressure for operating the material-adding means whenever a pressure drop shows that the liquid is withdrawn. A delay means operates the material adding means for a pre-determined interval after the switch changes state in response to stoppage of the withdrawal of the liquid. Also, a valve preferably prevents liquid entry into the system except during liquid withdrawal. The material-adding means is then activated on each liquid withdrawal and for a fixed interval thereafter, and no liquid enters the system without having added material. The system can also be operated without a delay means when the input is controlled so no input can occur except when the system is operating.

62 Claims, 5 Drawing Figures

CONTROL SYSTEM FOR LIQUID TREATMENT

THE INVENTIVE IMPROVEMENT

The invention was developed for a water purification system in which ozone is added to the water as a function of the water usage, but the system applies generally to relatively simple systems for adding material to a liquid on variable demand. The invention involves an appreciation of the factors involved in an ozone treatment system for water and the realization that efficiency and economy can be achieved with improvements on previously known systems. These involve better and simpler controls, more reliable operation, and less expensive components. The invention assures that water introduced into the system is treated for an interval sufficient to ensure purification, and venting and control means are arranged to keep the system safe and prevent any untreated water from passing through to the user.

SUMMARY OF THE INVENTION

The invention applies to a system for supplying pressurized liquid on variable demand including means for adding material to the liquid as a function of the variable demand, and the invention involves an improved control system for the material adding means. A switch is responsive to liquid pressure in a region of the system, and the switch is arranged to change state at a pressure change value related to withdrawal of liquid from the system. The switch is also arranged for operating the material adding means whenever the switch changes state in response to pressure falling below the pressure change value. Delay means responsive to the switch continues the operation of the material adding means for a pre-determined interval after the switch changes state in response to pressure rising above the pressure change value. The pressure region can be a variable depth of liquid in the system, pressure in the output line, or pressure differential between upstream and downstream lines in the system. Also, the delay means can be ommited if liquid input is prevented except when the material-adding means is operating.

DRAWINGS

FIGS. 1 – 4 are schematic diagrams of several preferred embodiments of the inventive control system; and FIG. 5 is a schematic diagram of an alternative switch means for the invention.

DETAILED DESCRIPTION

Figure 1:
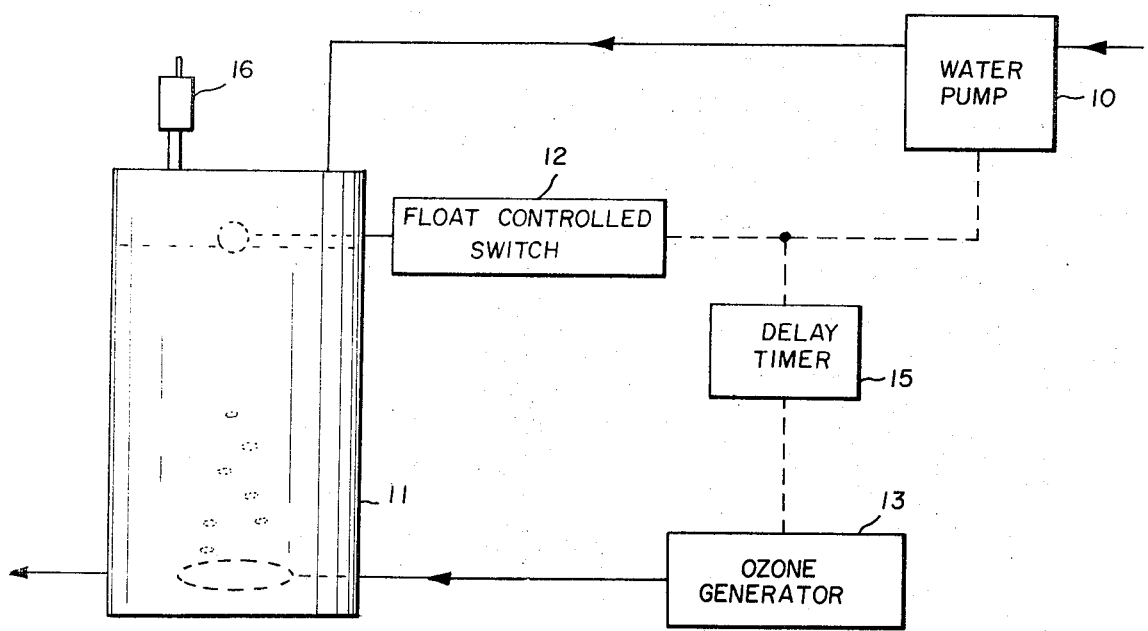

The control system of FIG. 1 shows one preferred variation of the invention as applied to a water system containing a water pump 10 for supplying water from a well. Tank 11 serves as both a purifier and water pressure container, and float-controlled switch 12 controls the water level in tank 11. An ozone generator 13 generates ozone which is forced into tank 11. A delay timer 15 is electrically connected to switch 12, pump 10, and generator 13 as schematically illustrated, and a pressure-responsive vent valve 16 vents any excessive gas pressure from the top of tank 11.

In the operation of the control system of FIG. 1, the variable depth of liquid in tank 11 serves as a pressure region monitored by float-controlled switch 12. Switch 12 changes state when the liquid level drops below a lower pressure change value, and changes state again when the liquid level rises above an upper pressure change value as related to the variable liquid depth. Alternatively, the liquid level in tank 11 can be monitored by a pressure differential switch connected between the top and bottom of tank 11, or by an output pressure switch cooperating with pressure vent 16. With any of the alternatives, the liquid rises and falls in pressure tank 11 during its withdrawal and addition to the system.

When the liquid pressure depth drops sufficiently in tank 11, switch 12 turns on pump 10 for adding more liquid to tank 11 and also turns on ozone generator 13 through delay timer 15. Ozone generator 13 operates all the time water pump 10 is adding liquid to the system. Water pump 10 shuts off when the liquid reaches its upper level in tank 11, as monitored by switch 12, and at this point, delay timer 15 takes over to continue the operation of ozone generator 13 for a pre-determined interval of about 5 minutes for example, to ensure that sufficient ozone is introduced into tank 11 to treat the raw water added by pump 10. Excess ozone, oxygen or other gas collects in a pressure head above the liquid in tank 11 and is vented by valve 16 when a pre-determined pressure is reached. No liquid is vented, because the liquid level is controlled by switch 12, and no untreated liquid can get through the system because ozone generator 13 operates whenever water pump 10 operates and for a short interval thereafter. Some liquid can be withdrawn without turning on pump 10, but such liquid is already treated with ozone and is safe to the user.

Delay timer 15 can be omitted from the system of FIG. 1 so long as liquid cannot enter the system except when ozone generator 13 is operating. This occurs in the embodiment of FIG. 1 where pump 10 supplies the liquid, and generator 13 operates whenever pump 10 operates. Also, generator 13 can be operated after pump 10 stops by using a delay means that does not measure a timed interval. For example, generator 13 can operate until a pre-determined pressure in excess of the shut-off pressure for pump 10 is built up in the top of tank 11.

The system of FIG. 1 is thus simple, safe, and efficient in combining a water purification tank with a water pressure tank, and using economical, reliable and safe controls. However, it requires that water pump 10 be under control of the system, and this is not always possible.

Figure 2:
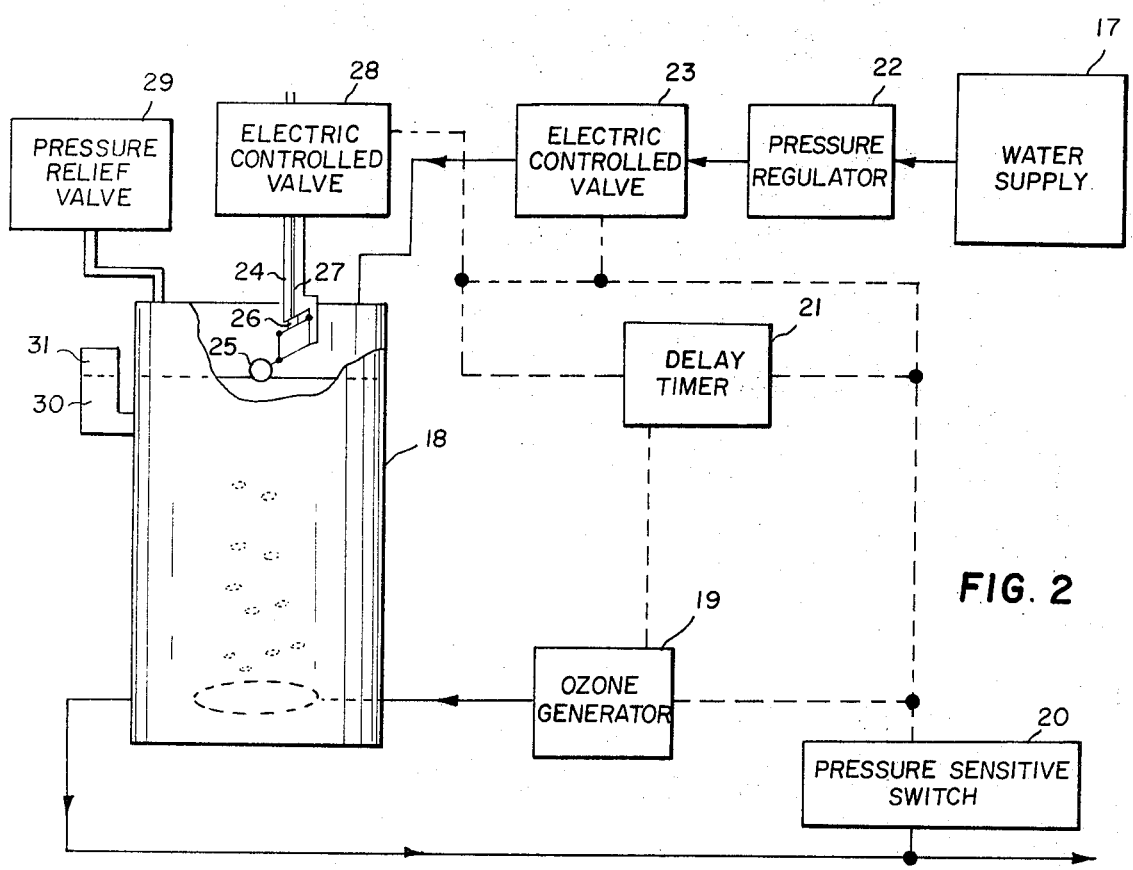

The system of FIG. 2 applies to a water supply 17 that can be any source of pressurized water including a well-pump, pressure tank, or water main. Tank 18 contains a volume of water for treatment, and ozone generator 19 forces ozone into the water in tank 18. The switch means for the control system of FIG. 2 is simply a pressure sensitive switch responsive to pressure in the output line from tank 11. Switch 20 turns on ozone generator 19 whenever output pressure drops indicating withdrawal of liquid from the system, and delay timer 21 runs ozone generator 19 for a brief interval after switch 20 detects a pressure rise in the output line indicating that water withdrawal has stopped.

Pressure regulator 22 is preferred to ensure fairly constant pressure in the liquid input so that switch 20 can respond reliably to pressures that are related to the input pressure. To ensure that no raw liquid gets through the system, an electric-controlled valve 23 is preferably arranged in the input line and controlled by switch 20. Valve 23 is opened only when switch 20 actuates ozone generator 19 in response to liquid withdrawal so that the inlet is closed unless ozone generator 19 is operating. Valve 23 can be closed when switch 20 changes state in response to a pressure rise in the output line, or can be held open until delay timer 21 shuts off ozone generator 19. Also, valve 23 preferably closes completely to any flow into tank 18, but allows slight reverse flow back from tank 18. Delay timer 21 can be omitted when valve 23 reliably prevents any liquid input except when ozone generator 19 is operating, and continued operation of generator 19 can be achieved by delay means other than an interval timer.

Since a gas pressure can build up in tank 18 from the continued operation of ozone generator 19 after liquid withdrawal has stopped, a preferred vent is shown for venting gas from tank 18. This is a vent 24 controlled by float 25 to raise and lower closure pad 26 which opens or closes vent line 27 as liquid respectively falls and rises in tank 18. Since vent valve 24 can leak, or can occasionally be left open when other parts of the system cease operating, a valve 28 is preferably arranged downstream from vent valve 24 and is opened and closed electrically, hydraulically, or pneumatically in response to switch 20 and delay timer 21 to allow venting only during operation of ozone generator 19. A preferred safety precaution for tank 18 is a pressure relief valve 29.

To prevent vent valve 24 being left open by a low water level when other components of the system stop operating, electric controlled valve 23 in the input line can be held open for a brief interval such as a few seconds after ozone generator 19 stops operating to ensure that liquid is available to raise the level in tank 18 sufficiently to close vent valve 24. This is preferably accomplished by timer 21. Another alternative to ensure closure of valve 24 is reservoir 30 containing a separate gas pressure head 31 and communicating with the liquid level in tank 18 so that if vent 24 is open when the system shuts down, gas head 31 forces some liquid from reservoir 30 into tank 18 to raise the level enough to close vent 24. Closure of vent 24 is desirable so that the pressure in tank 18 is not vented off enough to drop the pressure in the output and actuate switch 20 to initiate another cycle of the system.

Figure 3:
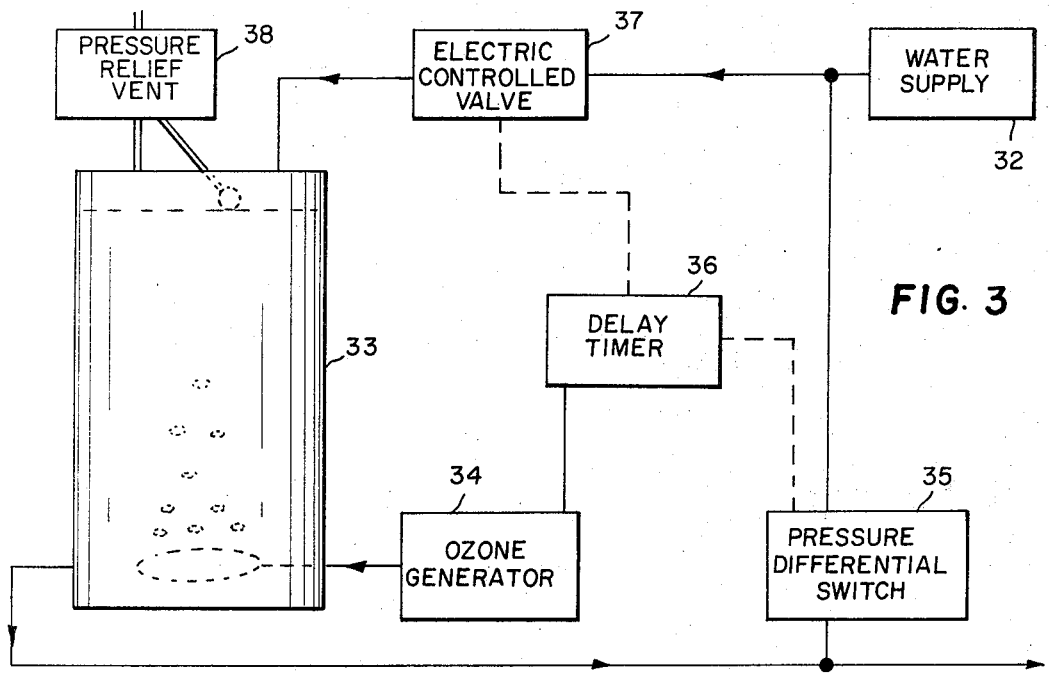

The system of FIG. 3 uses any convenient supply of pressurized water 32 and treatment tank 33 receiving ozone from generator 34. The main switch for the system of FIG. 3 is a pressure differential switch 35 connected between the input and output lines leading to and from tank 33 to change state at pressure change differential values between the input and output. These can reliably represent withdrawal and stoppage of withdrawal of liquid.

Switch 35 operates ozone generator 34 as previously described whenever water is withdrawn from the system, and delay timer 36 continues the operation of generator 34 for an interval after liquid withdrawal has stopped. Electric-controlled valve 37 in the input line is preferred to ensure that no raw water gets through tank 33, and valve 37 is controlled through switch 35 and timer 36 to open when withdrawal occurs and to close either when withdrawal stops or ozone generator 34 stops. Gas pressure is vented from the top of tank 33 by a valve 38 that is float controlled, controlled by switch 35, or pressure-operated.

Figure 4:
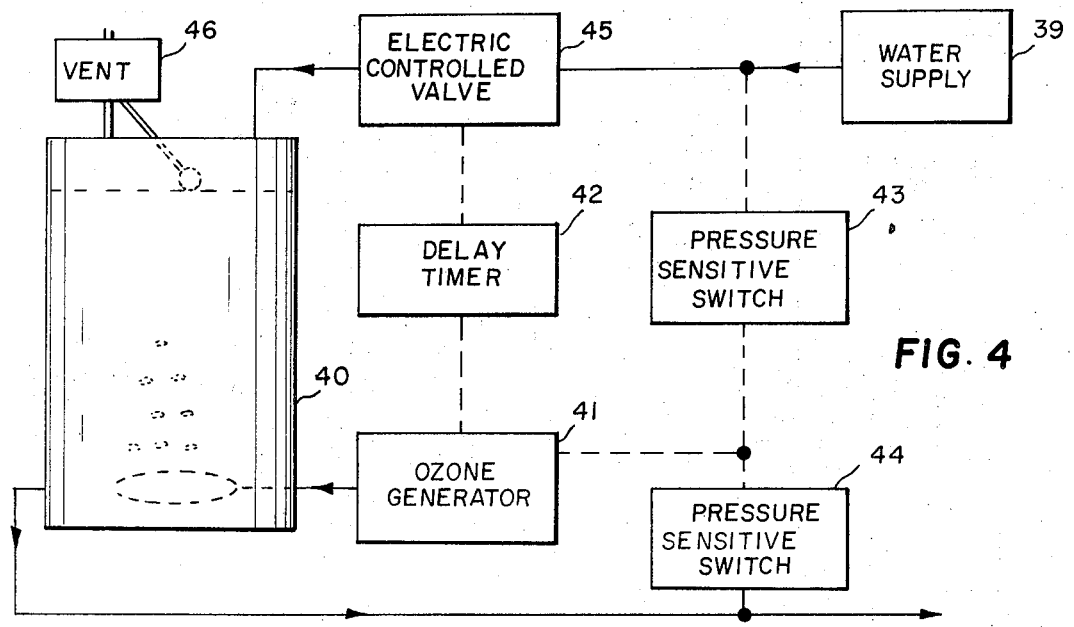

The system of FIG. 4 is similar to previous systems in having a water pressure supply 39, a treatment tank 40, an ozone generator 41, and a delay timer 42. It differs in having a pair of pressure sensitive switches 43 and 44 responsive respectively to input and output pressures and connected in series so that generator 41 operates only if input pressure is high and output pressure is low as signifying water withdrawal. An electric-controlled valve 45 responsive to delay timer 42 is preferably arranged in the input line so that no raw water enters tank 40 except when ozone generator 41 operates. Gas is vented from the top of tank 40 by a valve 46 that is float-controlled, controlled by switches 43 and 44, or pressure-operated.

Figure 5:
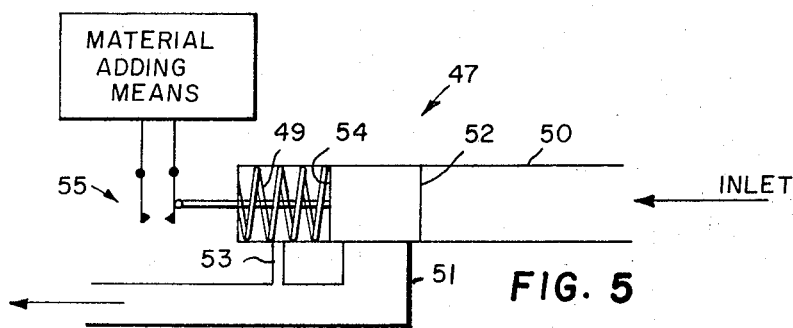

FIG. 5 schematically shows an alternative switch means usable with the inventive control system. Switch means 47 can be substituted for the switch means of the previous systems, and it is arranged preferably in the inlet line between an upstream and downstream region of the system. It includes a piston 48 biased by a spring 49 to the illustrated position where it closes a passageway between upstream line 50 and downstream line 51. Input pressure acts on piston face 52, and a feedback line 53 from downstream line 51 co-acts with spring 49 against piston face 54. When downstream pressure drops on water withdrawal, the pressure against piston face 52 exceeds the pressure against piston face 54, and piston 48 moves to allow flow through passages 50 and 51. Such movement closes switch 55 which is connected to a material-adding means such as an ozone generator. When downstream pressure rises as withdrawal ceases, it cooperates with spring 49 against piston face 54 to drive piston 48 back to the illustrated position closing the passageway between lines 50 and 51. Piston 48 is thus an hydraulically controlled valve arranged for operating the treatment system whenever inflow occurs, and for closing the inlet line whenever the treatment system is off.

The invention's use of pressure-responsive switching means as described above simplifies and economizes over prior art systems using flow-controlled switches or other complex, expensive and relatively unreliable means. Also, the invention's use of a simple delay timer to ensure adequate treatment of raw water added to the treatment tank is simpler and more reliable than prior art expedients. The invention also ensures that raw water does not seep through the system for leaks, and the invention can also be applied to adding materials other than ozone to liquids other than water.

The different suggestions for valves, timers, and switch means as described and illustrated, can be combined in various ways, and the drawings only show some of the possible combinations that are preferred. Those skilled in the art will appreciate the various available components and materials usable with the inventive system.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand how to apply the invention in various ways.

I claim:

1. In a system for supplying pressurized liquid on variable demand including means for adding material to said liquid as a function of said variable demand, an improved control system for said material adding means, said control system comprising:
   a. switch means responsive to and activated by liquid pressure in a region of said system;
   b. said switch means being arranged to change state at a pressure change value substantially above atmospheric pressure and related to withdrawal of said liquid from said system;
   c. said switch means being arranged for operating said material-adding means whenever said switch means changes state in response to said pressure in said region falling below said pressure change value;
   d. delay means for continuing said operating of said material adding means for a pre-determined interval after said switch means changes state in response to said pressure in said region rising above said pressure change value; and
   e. said pressure region is downstream from the input to said system and said pressure change value is related to the pressure of said liquid input in said system.

2. The control system of claim 1 wherein said switch means comprises an electric switch responsive to the pressure difference between said pressure region and said liquid input.

3. The control system of claim 2 including a valve normally closing said input, and means for opening said valve during said operation of said material adding means.

4. The control system of claim 3 wherein said added material is a gas and including vent means for venting gas from said liquid.

5. The control system of claim 1 including means for regulating the pressure of said input liquid.

6. The control system of claim 1 wherein said switch means includes a pair of pressure-sensitive switches connected in series and arranged respectively in said input and said pressure region for operating said material adding means whenever said input pressure is above a pre-determined value and said pressure in said region is below said pressure change value.

7. The control system of claim 1 including a valve normally closing said input, and said switch means being arranged for opening said valve whenever said pressure in said region is below said pressure change value.

8. The control system of claim 1 including a valve normally closing said input, and means for opening said valve during said operation of said material adding means.

9. The control system of claim 8 wherein said switch means comprises an electric switch responsive to the pressure difference between said pressure region and said liquid input.

10. The control system of claim 8 wherein said added material is a gas and including vent means for venting gas from said liquid.

11. The control system of claim 10 wherein said vent means includes a reservoir of a gas and said liquid in communication with a surface of said liquid in said pressure region.

12. The control system of claim 11 wherein said vent valve includes a float-controlled valve and a pressure relief valve.

13. The control system of claim 10 wherein said vent means includes a vent valve.

14. The control system of claim 13 wherein said vent valve is float-controlled.

15. The control system of claim 14 wherein said vent means includes delay means for holding said input valve open for a pre-determined interval after said material-adding means stops operating.

16. The control system of claim 14 including a normally closed valve downstream from said float-controlled valve and means for opening said downstream valve during said operation of said material-adding means.

17. The control system of claim 10 wherein said vent means includes a vent valve and an electric controlled valve downstream from said vent valve and closed when said material-adding means is not operating.

18. The control system of claim 8 including means for regulating the pressure of said input liquid.

19. The control system of claim 8 wherein said switch means includes a pair of pressure-sensitive switches connected in series and arranged respectively in said input and said pressure region for operating said material-adding means whenever said input pressure is above a pre-determined value and said pressure in said region is below said pressure change value.

20. The control system of claim 19 including a float-controlled valve for venting gas from said system.

21. The control system of claim 8 including delay means for holding said valve open for a pre-determined interval after said material-adding means stops operating.

22. The control system of claim 1 wherein said switch means includes an hydraulically actuated valve in said input arranged to open when said liquid is withdrawn from said system, and an electric switch operated by said hydraulic valve.

23. In a system for supplying pressurized liquid on variable demand including means for adding material to said liquid as a function of said variable demand, an improved control system for said material adding means, said control system comprising:
   a. switch means responsive to and activated by liquid pressure in a region of said system;
   b. said switch means being arranged to change state at a pressure change value substantially above atmospheric pressure and related to withdrawal of said liquid from said system;
   c. said switch means being arranged for operating said material-adding means whenever said switch means changes state in response to said pressure in said region falling below said pressure change value;
   d. delay means for continuing said operating of said material adding means for a pre-determined interval after said switch means changes state in response to said pressure in said region rising above said pressure change value; and
   e. said pressure region is a variable depth of said liquid.

24. The control system of claim 23 wherein liquid pressure at the bottom of said variable depth of said liquid varies as a direct multiple of said variable depth, and said switch means responds to said liquid pressure at said bottom of said variable depth by monitoring said variable depth with a float movable with said variable depth.

25. The control system of claim 24 including means for controlling the input of said liquid to said system, and means for operating said input control for allowing input of said liquid only during operation of said material-adding means.

26. The control system of claim 25 wherein said input control means includes a pump for supplying said liquid to said system, and means for operating said pump in response to said changes of state of said switch means.

27. The control system of claim 25 wherein said input control includes a valve normally closing said input, and means for opening said valve in response to said changes of state of said switch means.

28. The control system of claim 24 including a vent valve having a control float operating on said variable depth of said liquid.

29. The control system of claim 23 including means for controlling the input of said liquid to said system, and means for operating said input control for allowing input of said liquid only during operation of said material-adding means.

30. The control system of claim 29 including a pressure relief vent valve.

31. The control system of claim 29 wherein said added material is a gas and including vent means for venting gas from said liquid.

32. The control system of claim 31 wherein said input control means includes a pump for supplying said liquid to said system, and means for operating said pump in response to said changes of state of said switch means.

33. The control system of claim 31 wherein said input control means includes a valve normally closing said input, and means for opening said valve in response to said changes of state of said switch means.

34. The control system of claim 31 wherein said vent means includes a vent valve.

35. The control system of claim 34 wherein said vent valve is float controlled.

36. The control system of claim 35 including a normally closed valve downstream from said float-controlled vent valve and opened during said operation of said material adding means.

37. The control system of claim 35 including a reservoir of a gas in said liquid in communication with the surface of said variable depth of said liquid.

38. The control system of claim 35 including delay means for holding said input valve open for a pre-determined interval after said material-adding means stops operating.

39. The control system of claim 35 including a pressure relief valve.

40. The control system of claim 23 wherein said added material is a gas and including vent means for venting gas from said liquid.

41. The control syytem of claim 23 wherein said switch means includes a pressure differential switch for controlling said depth of said liquid.

42. The control system of claim 41 including means for controlling the input of said liquid to said system, and means for operating said input control for allowing input of said liquid only during operation of said material-adding means.

43. The control system of claim 42 wherein said input control means includes a pump for supplying said liquid to said system, and means for operating said pump in response to said changes of state of said switch means.

44. The control system of claim 42 wherein said input control means includes a valve normally closing said input, and means for opening said valve in response to said changes of state of said switch means.

45. In a system for supplying pressurized liquid on variable demand including means for adding material to a contained volume of said liquid as a function of said variable demand, an improved control system for said material-adding means, said control system comprising:
   a. switch means responsive to and activated by liquid pressure in a region of said system;
   b. said switch means being arranged to change state at a pressure change value substantially above atmospheric pressure and related to withdrawal of said liquid from said system;
   c. said switch means being arranged for operating said material adding means to add said material to said contained volume of said liquid whenever said switch means changes state in response to said pressure in said region falling below said pressure change value; and
   d. means cooperable with said switch means for allowing said liquid to enter said contained volume when said material adding means is operating and for preventing said liquid from entering said contained volume when said material adding means is not operating.

46. The control system of claim 45 wherein said cooperable means includes a valve in the input to said system and responsive to said switch means.

47. The control system of claim 46 wherein said pressure region is a variable depth of said liquid with said liquid pressure at the bottom of said variable depth of said liquid varying as a direct multiple of said variable depth, and said switch means responds to said liquid pressure at said bottom of said variable depth by monitoring said variable depth with a float movable with said variable depth.

48. The control system of claim 46 wherein said pressure region is downstream from the input to said system, and said switch means is pressure-responsive.

49. The control system of claim 48 wherein said switch means includes a pair of pressure-sensitive switches connected in series and arranged respectively in said input and said pressure region for operating said material adding means whenever said input pressure is above a pre-determined value and said pressure in said region is below said pressure-change value.

50. The control system of claim 48 wherein said switch means comprises an electric switch responsive to the pressure difference between said pressure region and said liquid input.

51. The control system of claim 48 including a pressure regulator in said input.

52. The control system of claim 45 including a pump for supplying said liquid to said system, and wherein said cooperable means is arranged for operating said pump in response to said changes of state of said switch means.

53. The control system of claim 52 wherein said pressure region is a variable depth of said liquid, said material added to said liquid is a gas, and wherein vent means is arranged above said depth of liquid.

54. The control system of claim 53 wherein said switch means includes a float movable with said variable depth of said liquid, and said vent means includes a pressure-responsive valve.

55. The control system of claim 52 wherein said pressure region is downstream from the input to said system and said switch means is pressure responsive.

56. The control system of claim 55 including pressure regulating means in said input.

57. The control system of claim 56 including a normally-closed, electric-controlled valve downstream from said float-controlled valve and opened during said operation of said material adding means.

58. The control system of claim 45 wherein said added material is a gas, and including vent means for venting gas from said liquid.

59. The control system of claim 58 wherein said vent means is a float controlled valve.

60. The control system of claim 58 wherein said vent means is an electro-mechanical valve.

61. The control system of claim 60 including a pressure relief valve in series with said electro-mechanical valve.

62. The control system of claim 58 wherein said vent means is a pressure relief valve.

* * * * *